United States Patent [19]

Inoue et al.

[11] Patent Number: 5,447,701
[45] Date of Patent: Sep. 5, 1995

[54] GAS PURIFICATION METHOD

[75] Inventors: Norio Inoue; Makoto Sakura, both of Kanagawa; Eiki Iida, Tokyo, all of Japan

[73] Assignee: Nikki-Universal Co., Ltd., Tokyo, Japan

[21] Appl. No.: 13,301

[22] Filed: Feb. 4, 1993

Related U.S. Application Data

[62] Division of Ser. No. 814,760, Dec. 30, 1991, Pat. No. 5,236,878.

[30] Foreign Application Priority Data

Dec. 28, 1990 [JP] Japan .................. 2-409224

[51] Int. Cl.$^6$ .............. C01B 17/16; C01B 21/00; C01B 31/18
[52] U.S. Cl. .................. 473/224; 423/237; 423/239.2; 423/244.11; 423/245.3; 423/247
[58] Field of Search .......... 423/239 Z, 239, 239 A, 423/244.11, 245.1, 245.2, 224, 287

[56] References Cited

U.S. PATENT DOCUMENTS

| | | | |
|---|---|---|---|
| 4,019,879 | 4/1977 | Rabo et al. | 95/902 |
| 4,668,648 | 5/1987 | Strack et al. | 562/64 |
| 4,795,482 | 1/1989 | Gioffre et al. | 95/902 |
| 5,012,037 | 4/1991 | Poshi et al. | 95/96 |
| 5,013,335 | 5/1991 | Marcus | 95/902 |
| 5,078,979 | 1/1992 | Dunne | 423/213.7 |
| 5,106,396 | 4/1992 | Milariten | 95/99 |

FOREIGN PATENT DOCUMENTS

| | | |
|---|---|---|
| 60-132643A | 7/1985 | Japan . |
| 62-071534A | 4/1987 | Japan . |
| 2-115020 | 4/1990 | Japan .................. 423/245.1 |
| 2261458A | 10/1990 | Japan . |
| 3-221140 | 9/1991 | Japan .................. 423/245.1 |
| 1324392 | 7/1973 | United Kingdom . |

*Primary Examiner*—Gary P. Straub
*Attorney, Agent, or Firm*—Fish & Richardson

[57] ABSTRACT

An adsorbent comprising a sepiolite and a zeolite, especially silicalite and a zeolite-containing adsorptive decomposition composition comprising the adsorbent and a catalyst component supported thereon are disclosed.

A method of deodorizing which comprising using a composition comprising a sepiolite and a zeolite as an adsorbent and a method of purifying a gas containing unpleasant odors or noxious components, which comprises adsorbing such odors or noxious components in the gas on an adsorptive decomposition composition comprising the adsorbent and a catalyst component supported thereon and periodically or non-periodically heating said composition to desorb and decompose the adsorbates therefrom are also disclosed.

Adsorptive compositions and adsorptive decomposition compositions have a large adsorption and desorption rate, get little degradation in their performances at repeated use, and exhibit excellent water resistance, namely, a large adsorption and decomposition capacity even when they are wet.

The adsorptive decomposition composition can not only adsorb odorous components from the gas but also catalytically decompose in situ those adsorbates desorbed therefrom by heat regeneration and makes possible a continuous deodorizer regeneration type deodorization.

14 Claims, 15 Drawing Sheets

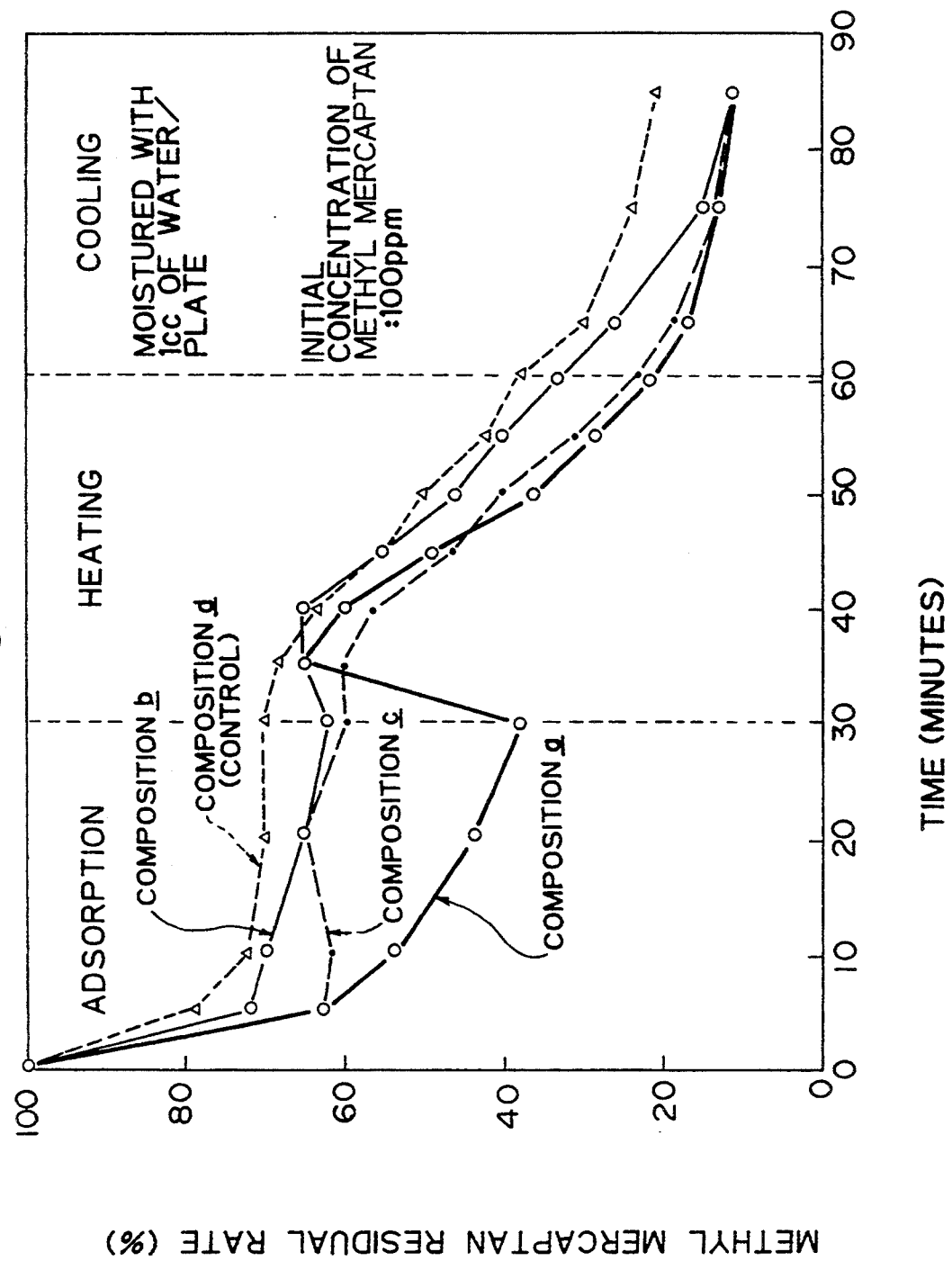

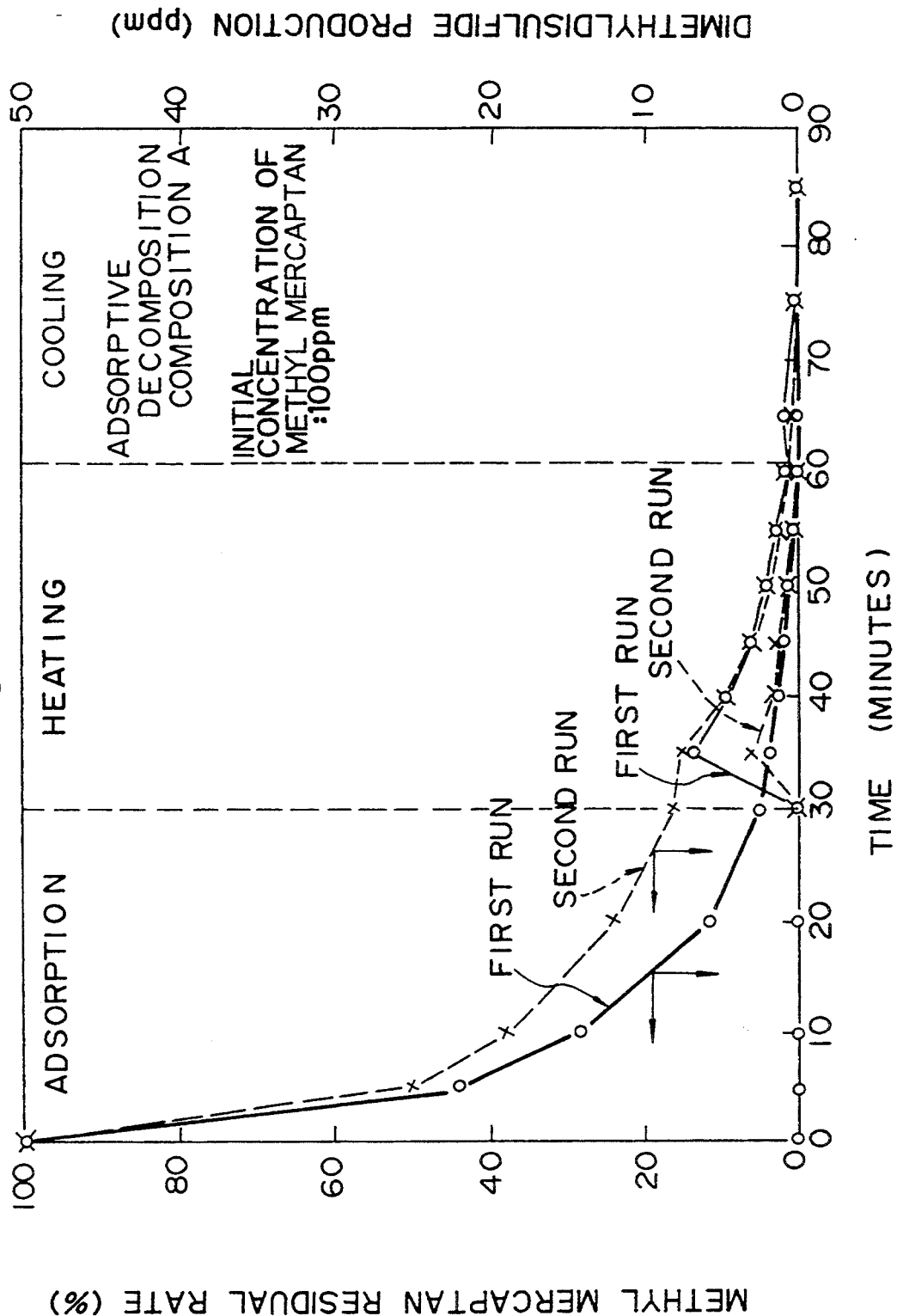

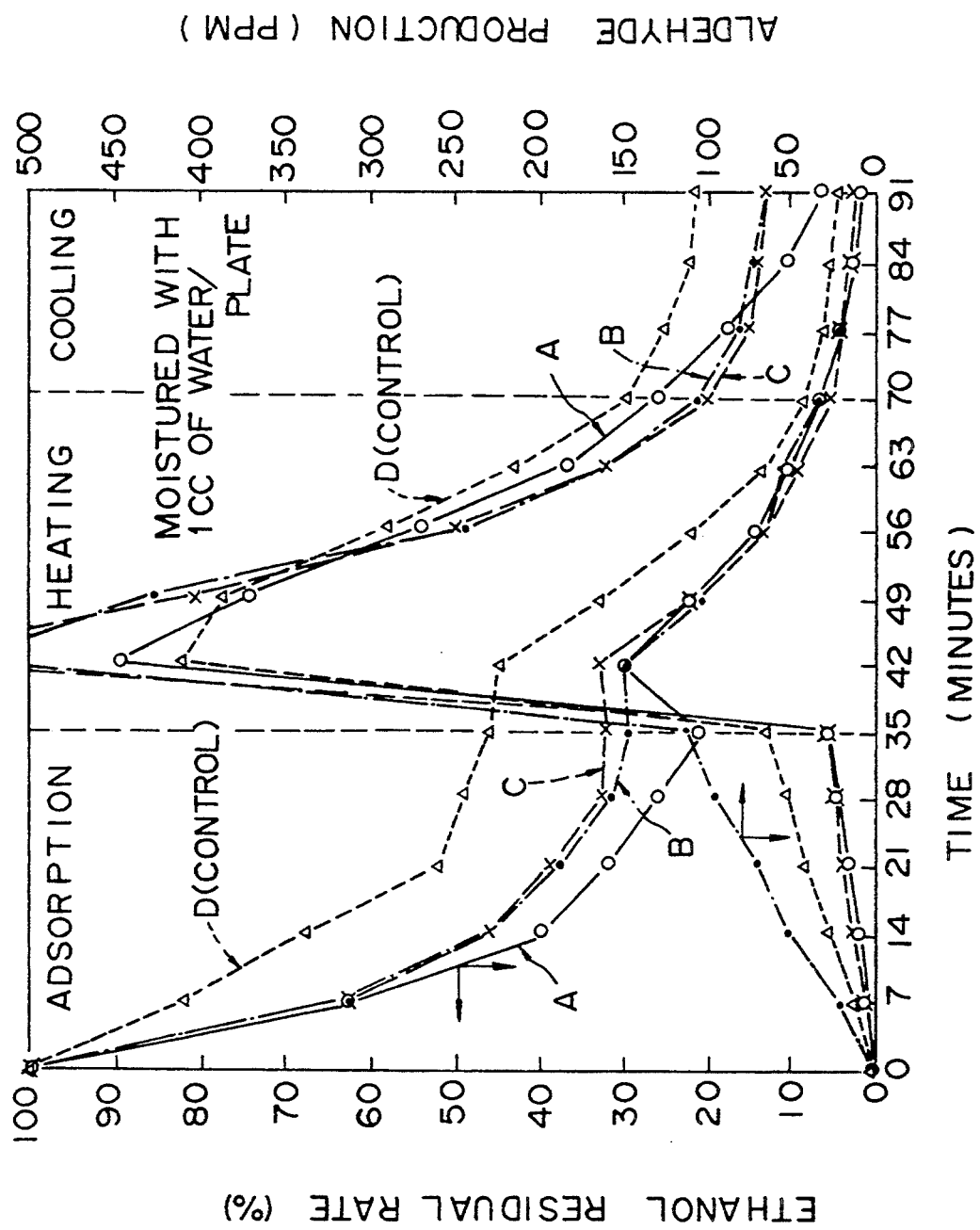

GAS PURIFICATION METHOD

This application is a divisional application of U.S. application Ser. No. 07/814,760, filed Dec. 30, 1991 now U.S. Pat. No. 5,236,878, Aug. 17, 1993.

BACKGROUND OF THE INVENTION:

1. Field of the Invention

The present invention relates to an adsorptive composition which can adsorb and remove unpleasant odors and/or noxious components (hereinafter referred to as odorous components) in a gas to be treated, and also relates to an adsorptive decomposition composition which can not only adsorb odorous components from the gas but also catalytically decompose those adsorbates desorbed therefrom by heat regeneration.

2. Description of the Prior Art

In order to adsorb and remove odorous components in a gaseous phase, adsorbents such as activated carbon, zeolite, silica gel, alumina, etc. have been used. Methods of decomposing odorous gases by an oxidative decomposition catalyst have been widely employed.

Japanese Patent Public Disclosure No. 53-109874 discloses an apparatus for treatment of odorous gases which comprises an adsorbent which is capable of adsorbing such gases and a catalyst for oxidative combustion of those adsorbates desorbed from the adsorbent in the regeneration thereof. This reference teaches a single layer obtained by sufficiently mixing an adsorbent and a catalyst, a layer in which adsorbent and catalyst layers are stacked alternately, and a filled layer of an adsorbent on which a catalyst metal is deposited to exhibit both activities of adsorption and catalytic oxidation. The reference teaches that adsorbents such as activated carbon, activated alumina, silica gel and zeolite can be used.

Commonly assigned Japanese Patent Application Nos. 1-299533 and 2-89825 disclose an adsorbent which comprises a sepiolite and a catalyst supported thereon. Commonly assigned Japanese Patent Application Nos. 1-270223, 1-282850 and 2-89824 disclose an adsorptive decomposition deodorizer which comprises a sepiolite and catalyst supported thereon. The inventions in accordance with the earlier applications have many advantages such that they preclude any danger of ignition at regeneration, and exhibit excellent adsorptivity and durability, and ease of regeneration. Commonly assigned Japanese Patent Application No. 2-169330 discloses a porous sepiolite which has an improved resistance to water that it will not peptize by soaking it in water and an improved resistance to thermal shock, and a process for producing the same. Commonly assigned Japanese Patent Application No. 2-206481 discloses a porous sepiolite which has an improved adsorptivity and a process for producing the same and an adsorptive decomposition catalyst utilizing such porous sepiolite.

The adsorptive decomposition deodorizer in accordance with the earlier application is suitable for many purposes which vary from large scale treatments such as removal of noxious gases exhausted from factories to small scale treatments such as the removal of odorous gases in a storage compartment of a refrigerator. In order to adapt said adsorption decomposition deodorizer to more various applications, deodorizers having a higher performance are needed. A deodorizer having a larger adsorption rate and adsorption capacity can make the equipment smaller, and an adsorptive decomposition deodorizer which can be regenerated in situ without being taken out of the equipment is able to enlarge the degree of freedom with respect to the design of equipment.

SUMMARY OF THE INVENTION

As a result of further studying improvements in the adsorptive decomposition deodorizer in accordance with the earlier application, we found that the addition of a zeolite to a sepiolite exhibits a great improvement in adsorption and desorption.

Therefore, this invention provides an adsorbent which comprises a sepiolite and a zeolite, and a zeolite-containing adsorptive decomposition composition which comprises the adsorbent and a catalyst component supported thereon.

BRIEF DESCRIPTION OF THE DRAWINGS:

FIGS. 1 to 11 are graph representations showing the effects of the present invention.

DETAILED DESCRIPTION OF THE PREFERRED EMBODIMENTS

Figure 1:
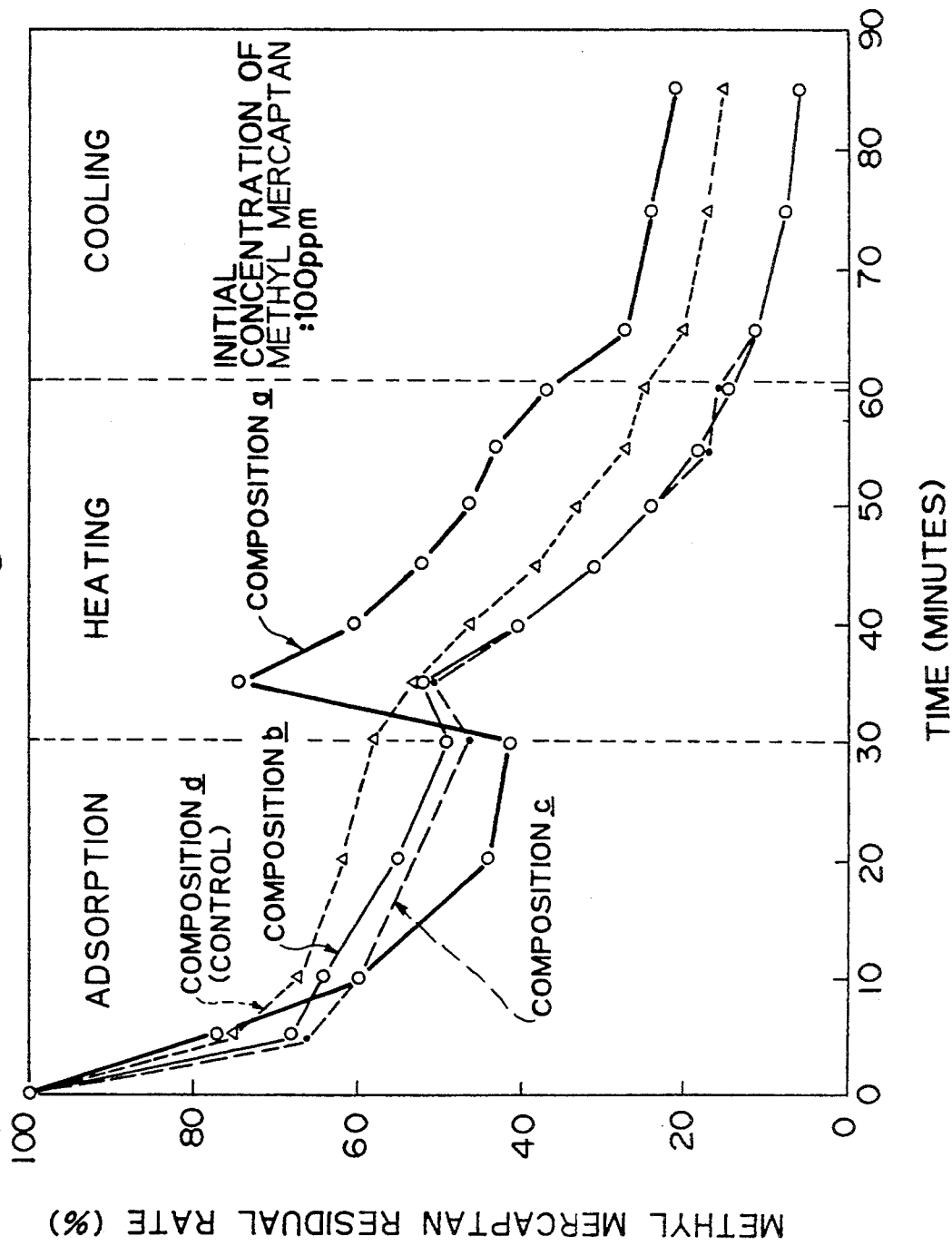

One of the constituents of said adsorbent of the present invention is a sepiolite. Sepiolite is a hydrous magnesium silicate and has a crystalline structure. Sepiolite has a structure in which long and narrow tunnels are formed by piling up ribbons of talc fibers into a brick construction. Sepiolite is produced in Fukuoka and Hokkaido in Japan, and Turkey, Spain and the U.S.A. etc. Any kind of sepiolite can be used in the present invention though their chemical composition and crystal structure are slightly different. Synthesizing of sepiolite has recently been conducted and synthesized sepiolite can also be used in tile present invention. Some literature has been published such as R. OHIRA, "Recent Topics of Sepiolite", Nendokagaku Vol. 24, No. 4, pp.137–145, 1984 (in Japanese) and T. WADA, "New Type Adsorbent, Thixotropy, Cohesion: Sepiolite", MOL, The Separate Volume of March, 1982.

The other constituent of the adsorbent of the present invention is a zeolite. Generally, a zeolite is a crystalline aluminosilicate of metal elements of Group IA or IIA of the Periodic Table, and is an inorganic ion exchanger having the empirical formula:

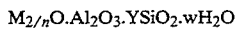

where M stands for a metal ion, n stands for the number of valences of the metal M, y stands for an integer of not less than 2, and w stands for a water content in pores of the zeolite. Examples of zeolites that can be used in the present invention include natural sepiolites such as chabazite, mordenite, erionite, faujasite, and clinoptilolite, and synthesized zeolites such as Zeolite A, Zeolite X, Zeolite Y, Zeolite L, Zeolite Omega and ZSM-5.

Preferable zeolites in the present invention, which are powders of less than 100 mesh size, preferably finer than 150 mesh, are a crystalline silica having a silica/alumina ratio of not less than 12, and a crystalline silica which contains very little amount of alumina, that is, a silicalite. A silicalite is most preferable. Since the alumina content of a silicalite is nearly zero, its ion exchange capacity is extremely small and it is hydrophobic and organophilic.

A representative silicalite has the empirical formula:

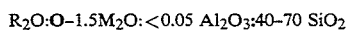

where R and M stand for a tetraethyl ammonium ion and an alkali metal cation, respectively. This silicalite can be sintered to remove organic cations by pyrolysis. The present invention can utilize both sintered and non-sintered silicalite. Silicalites do not contain alumina, however, contaminant alumina in raw materials remains in the resultant silicalite. Such a small amount of alumina has no effect on the properties of silicalite. The silica/alumina ratio of silicate used in this invention is at least 100, preferably at least 150, more preferably at least 400. Details on manufacturing and characteristics of silicalites are described in literature such as Japanese Patent Public Disclosure No. 54-72795, Japanese Patent Publication No. 56-40084 and "Silicalite, New Hydrophobic Crystalline Silica Molecular Sieve", Nature Vol. 271, No. 5645, pp 512-516.

Preferred processes for producing a composition according to the present invention will be described below.

Sepiolite is ground to a powder of less than 100 mesh size, preferably finer than 150 mesh, and the above mentioned zeolite is added thereto to make a composition having a sepiolite content in the range of 90-10 wt. %, preferably 70-10 wt. %, more preferably 60-30 wt. %, and a zeolite content in the range of 10-90 wt. %, preferably 30-90 wt. %, more preferably 40-70 wt. % of the final composition except the catalyst component.

Water is then added to the mixture of sepiolite and zeolite to make moisture-conditioned powder having a water content in the range of 40-200 wt. %, preferably 45-55 wt. %. At the humidity-conditioning stage, water-soluble oxygen-containing compounds such as alcohols, esters, ethers, ketones, acetone, and nitriles can be used together with water. The water-added mixture is stirred to make it uniform.

The humidity-controlled sepiolite-zeolite mixture powder is molded by, for instance, pressure molding into an appropriate shape and the resulting product is dried at a temperature in the range of 100°-150° C. The dried mold is then calcined at a temperature in the range of about 650°-800° C., preferably in the range of 700°-800° C., more preferably in the range of 720°-770° C., to produce a mold component of which sepiolite has a crystalline structure similar to that of metaseplolite range. The resultant can be washed with an acid such as nitric acid, sulfuric acid, and hydrochloric acid, then rinsed with water and dried.

Any catalyst components that are capable of decomposing odorous gases which have been desorbed can be supported onto compositions of the present invention. The catalyst components include a metal element, an oxide or a complex compound of at least one metal selected from the group consisting of platinum group metals such as rhodium, palladium, osmium, iridium, and platinum; iron group metals such as iron, cobalt and nickel; Group I metals such as copper and silver; Group VII metals such as manganese; and rare earth metals such as cerium and lanthanum. Such a catalyst component can be used alone or in combination with another.

Among said metals, the platinum group metals are preferable, especially use of platinum and/or palladium is preferred. The addition of a rare earth metal, especially cerium and/or lanthanum in the catalyst components improves the heat-resistance of the catalyst.

The supporting amount of catalyst components depends upon the kind of catalyst to be used, and odorous gases to be treated. Usually 0.1-10 g/l, preferably 0.5-5 g/l more preferably 1-2 g/l of the catalyst is used. A rare earth metal in an amount of 1-100 g/l and preferably 5-20 g/l of catalyst can be supported on the catalysts.

Adsorptive-decomposition compositions of the present invention can be manufactured by preparing an adsorptive composition comprising sepiolite and zeolite; then soaking the composition in an aqueous solution of desired catalyst components; drying the resulting composition in a stream of oxygen; and thereafter heat-treating the composition in a hydrogen stream at an elevated temperature. The above-mentioned composition can be treated with an aqueous solution of an inorganic acid solution before being soaked in the aqueous solution of catalyst components. Alternatively, adsorptive compositions can be prepared by soaking sepiolite in an aqueous solution of catalyst components; then mixing the catalyst-bearing sepiolite with a zeolite; humidity controlling the resulting mixture; and molding the resultant into an adsorptive-decomposition composition. Alternatively, a catalyst-supported zeolite can be mixed with sepiolite to make an adsorptive-decomposition composition.

Adsorptive decomposition compositions of the present invention can treat odorous gases containing amines such as trimethylamine, a sulfur-containing compound such as methylmercaptan, ammonia, aromatic compounds such as benzene and toluene, alcohols such as ethanol and methanol, olefins such as ethylene, propylene and butylene, aldehydes such as acetaldehyde and formaldehyde and esters such as butyl acetate.

Odorous components in a gas are adsorbed on the present adsorptive decomposition composition upon contact therewith. This adsorption is usually performed at ambient or lower temperatures and under atmospheric pressure. Said adsorptive decomposition composition is allowed to stand in contact with the gas containing odorous components to be treated for a predetermined time for adsorption and removal, and is regenerated by periodically or non-periodically heating said composition. This desorption and catalytic decomposition process is performed by heating the present composition up to a temperature in the range of 200°-500° C., preferably 250°-350° C. Adsorbed odorous components are desorbed and simultaneously decomposed (usually oxidatively decomposed) by the action of catalyst components.

The adsorptive decomposition composition of the present invention can be used for adsorbing and removing odorous gases from the air for example in the storage compartment of a refrigerator. Because the cooling capacity of refrigerators with a forced-circulation fan of chilled air is lowered by the frosted freezing condenser, the defrosting heater works automatically. When the adsorptive decomposition deodorizer of the present invention is set up in the vicinity of the defrosting heater placed in a circulation passage for the chilled air, since the air in the refrigerator is circulated through the circulation passage by a fan during the cooling operation of the refrigerator, at this time odorous gases generated from stored foodstuffs are adsorbed and removed by the above-mentioned adsorptive decomposition composition, whereby deodorizing in the refrigerator is achieved. When the defrosting operation is started, heated air flows over the adsorptive decomposition composition through the above-described circulation passage. The heat enables the odorous gases to be desorbed and decomposed by oxidation. Therefore the adsorptive decomposition composition of the present invention can be effectively used as a deodorizer for refrigerators. Furthermore, compositions of the present invention can be advantageously utilized in an atmosphere of high humidity as in the storage compartments of refrigerators, since the present compositions are less affected by moisture than the prior art compositions.

The following examples will illustrate the present invention.

Example 1

A Turkish sepiolite of a high purity (purity 92% or higher) containing 17 wt. % of water was ground to 200 mesh or finer particles and mixed well with a mortar mixer. A 5 kg silicalite having a $SiO_2/Al_2O_3$ ratio of 400 or more (PURASIV-420 manufactured by UOP) was added to 6 kg of the powdered sepiolite (5 kg as anhydride), followed by mixing therewith well. To the resulting powder of sepiolite and silicalite water was added in an amount of 5 Kg, and the water-added powder was mixed well by hands, without kneading, to yield a homogeneous moisture-controlled material. The moisture-controlled sepiolite-silicalite mixture was subjected to a screen to adjust its particle size. The mixture was molded under pressure into a sepiolite-silicalite complex plate. The resultant plate was dried at a temperature of 120° C. for 12 hours, followed by calcination at a temperature of 740° C. for 3 hours to yield a Plate Molding a of 54 mm×18 mm×6 mm.

Example 2

The same procedure as Example 1 was repeated, except that a Y-type hydrophobic zeolite (PURASIV-490 available from UOP) was used instead of said silicalite as zeolite constituents, to obtain a Plate Molding b.

Example 3

The same procedures as Example 1 were repeated, except that a 13X-type hydrophobic zeolite (PURASIV-628; UOP) derived from Zeolite Y was used instead of said silicalite as zeolite constituents, to obtain a Plate Molding c.

Example 4

The Plate Moldings a, b, and c obtained in Examples 1 to 3, each 36 pieces, were soaked in a solution. This solution was prepared by mixing 21.4 g of an aqueous solution of hexamineplatinum(IV) chloride (Pt content of 1.463%) and 0.74 g of 28% aqueous ammonia (Wako Pure Chemicals) and adjusting the mixture to that having a pH of 10.5 and diluting it with water to 1440 ml.

Each plate was washed with water, dried and then reduced In a hydrogen gas flow at a temperature of 500° C. to obtain Adsorptive Decomposition Composition A, B, and C bearing 1.45 g/l 1.49 g/l, and 1.49 g/l of platinum, calculated as Pt metal respectively.

Comparative Example 1

The same procedures as Example 1 were repeated, except that 10 kg of sepiolite without silicalite was used to yield a Sepiolite Plate Molding d of 54 mm×18 mm×6 mm.

Comparative Example 2

Said Sepiolite Plate Molding j was in Comparative Example 1 treated in the same manner as shown in Example 4 to obtain Adsorptive Decomposition Composition D bearing 1.48 g/l of platinum.

Example 5

Methyl Mercaptan Reaction Test

The Plate Moldings a, b, c of the present invention, and the control sample j thus obtained were each placed in a 16-liter glass vessel, and methylmercaptan was charged thereinto so as to make a concentration in the vessel of 100 ppm. After allowing it to stand for 30 minutes, the surface temperature of the sample was elevated up to a temperature of 300° C. for 30 minutes, and after allowing it to cool for 25 minutes, the changes of methylmercaptan concentration were determined. The results are shown in FIG. 1.

The residual rate (%) was obtained from the following equation:

Residual Rate (%)=Ct/Co×100 wherein Co means an initial concentration and Ct means a concentration at a time of t.

It is evident from FIG. 1 that the compositions of the present invention have a adsorption rate larger than that of the control sample that consisted of sepiolite with no zeolite.

Example 6

The same methyl mercaptan-test procedures as Example 5 were repeated, except that each sample was dampened with 1 cc of water per plate. The results are shown in FIG. 2. It is shown in the FIG. 2 that the compositions of the present invention, especially Plate Molding a having a silicalite as a zeolite, exhibit a large adsorption rate even when it had absorbed water.

Example 7

Figure 3B:
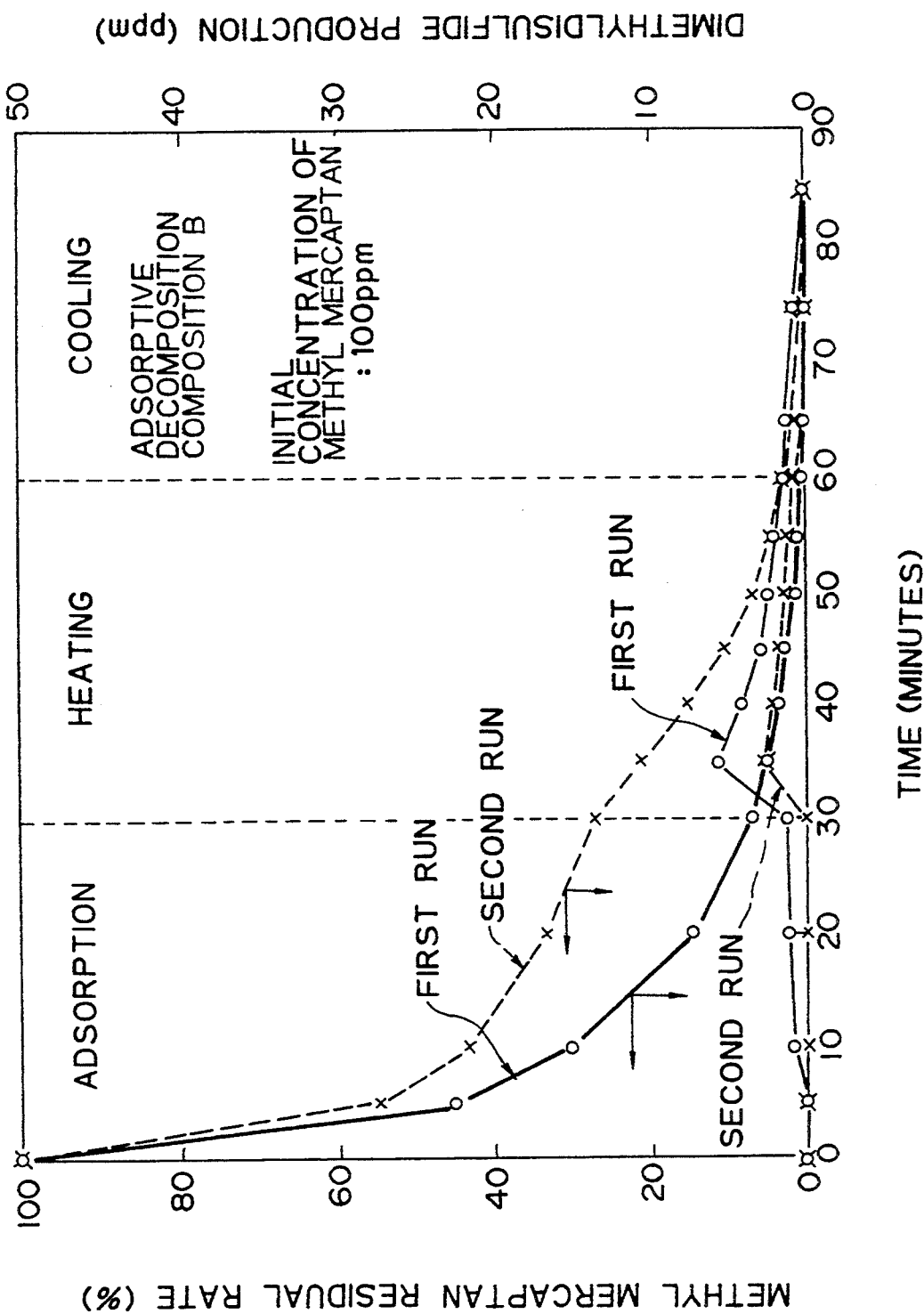
Figure 3C:
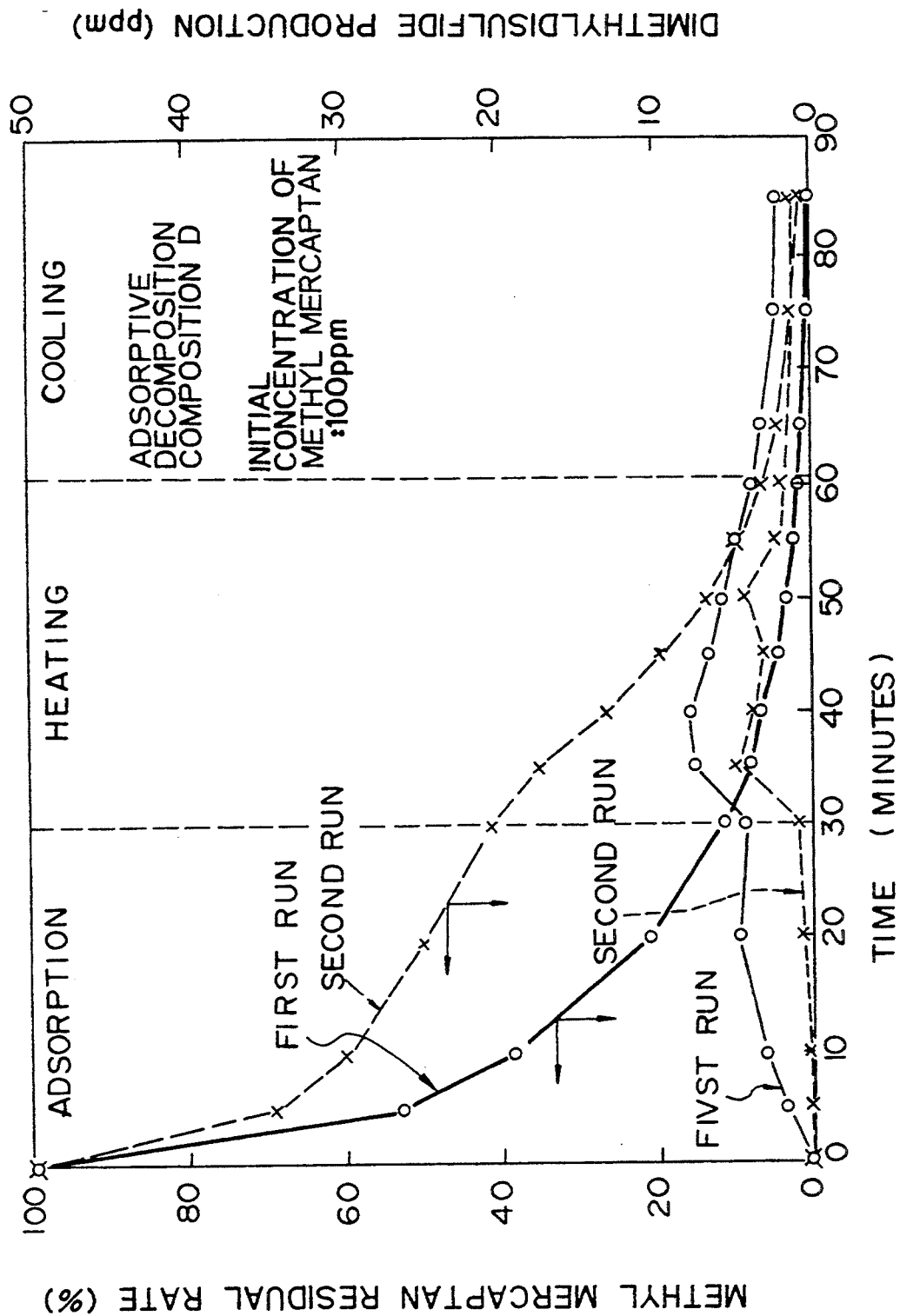

Each of Adsorptive Decomposition Composition A, B and Control D was subjected to the same methyl mercaptan test as Example 5 twice. The results are illustrated in FIG. 3-A to FIG. 3-C. The Figures show that the adsorptive decomposition compositions of this invention have both larger adsorption and desorption rates, and generate less dimethyldisulfide than those of the control.

Example 8

Figure 4A:
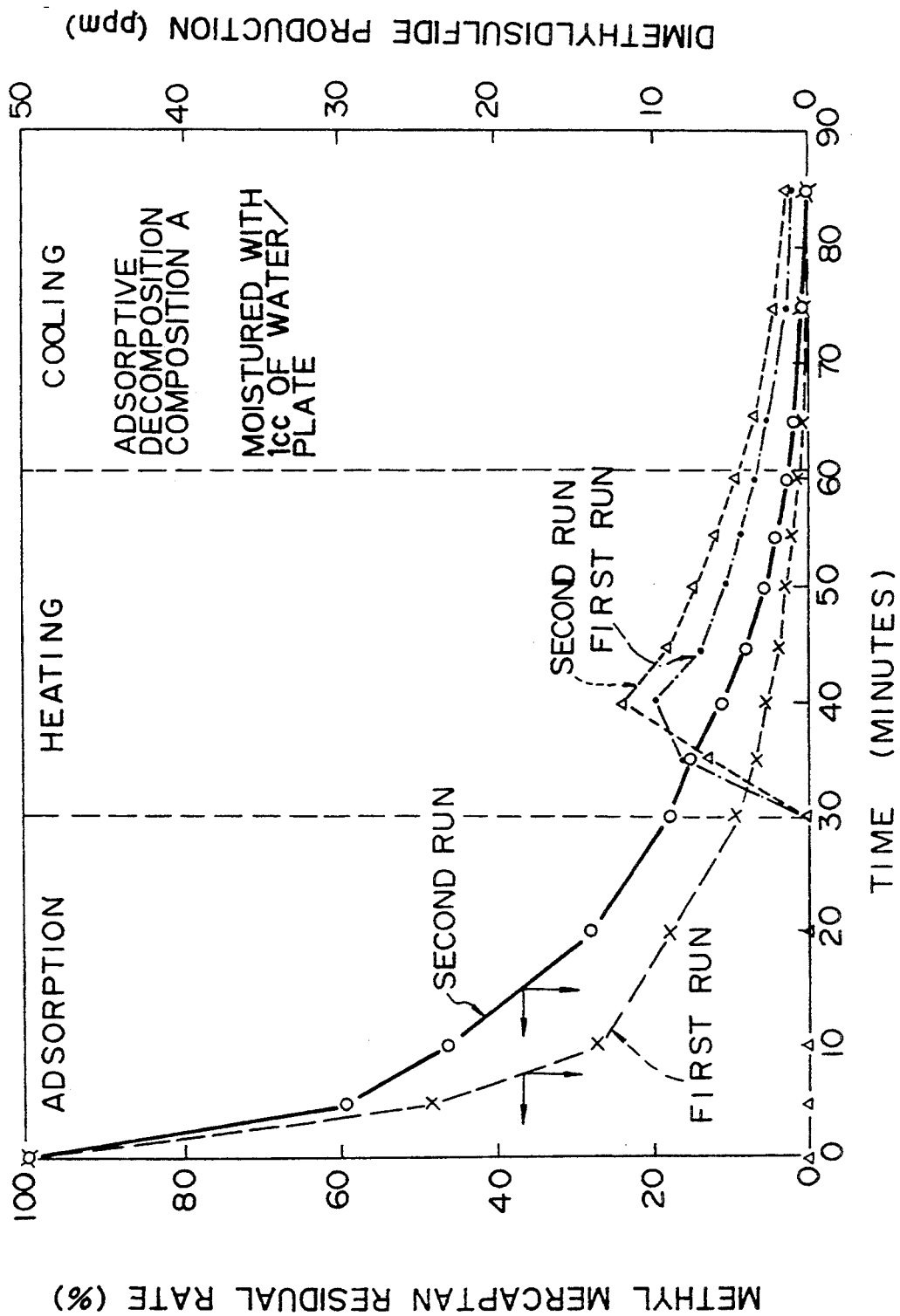
Figure 4B:
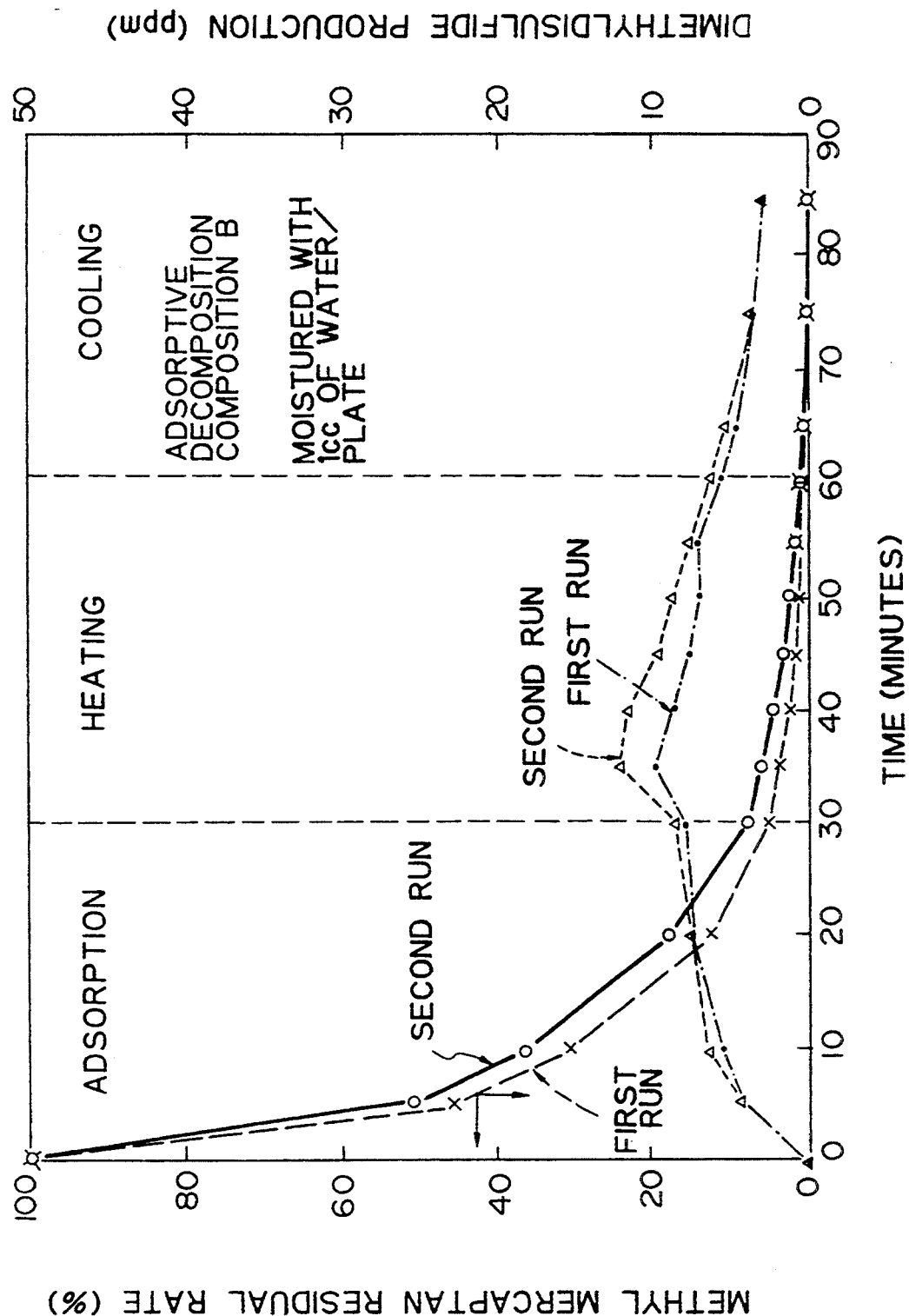
Figure 4C:
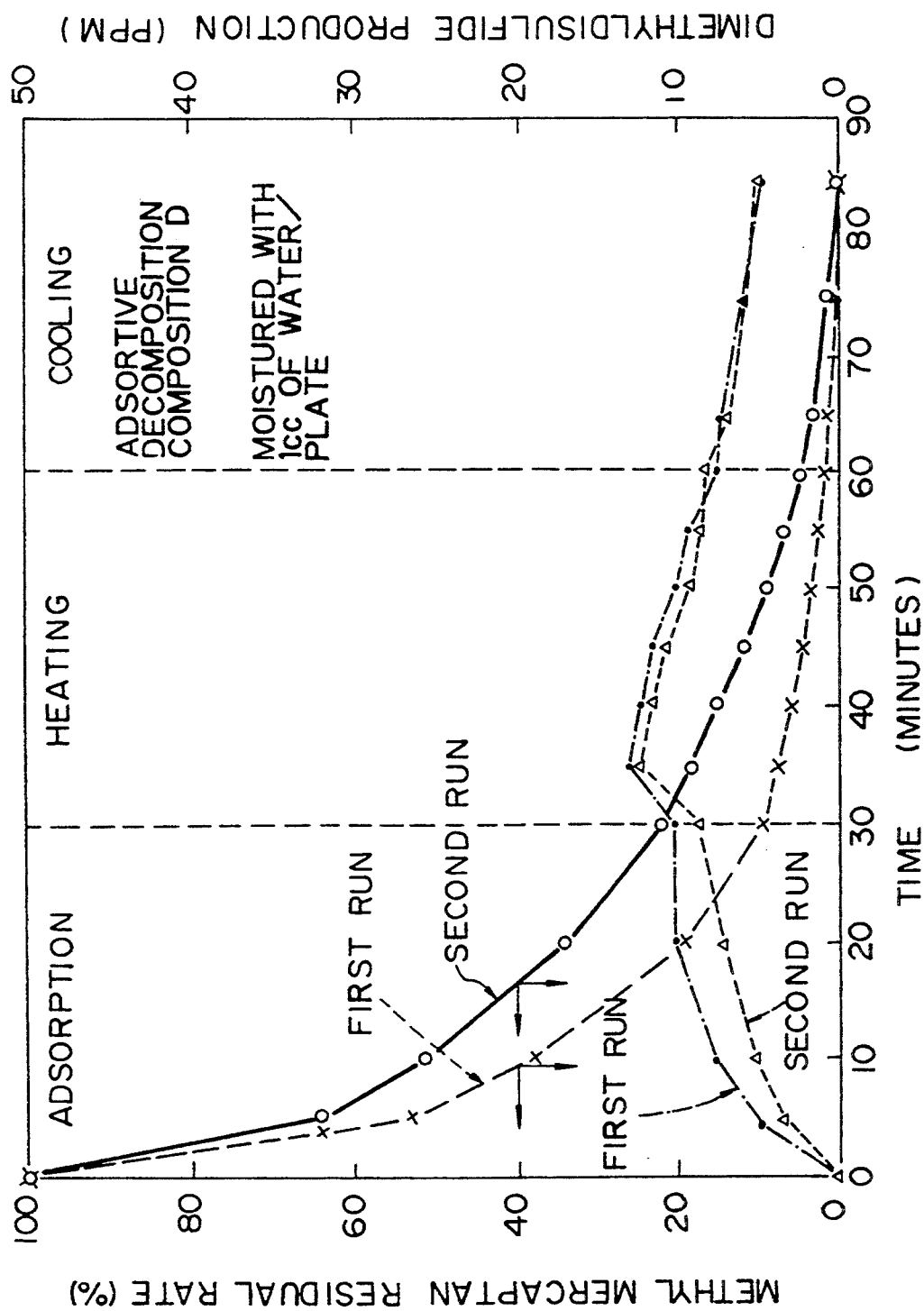

Each of Adsorptive Decomposition Compositions A and B and Control D was subjected to the same methyl mercaptan test as Example 5, except that each sample was dampened with 1 cc of water per one plate. The results are shown in FIG. 4-A to FIG. 4-C. Adsorptive Decomposition Composition A in which a catalyst was supported on Plate Molding a having silicalite as a zeolite, shows a larger rate of adsorption and desorption—decomposition even than those of the control.

Example 9

Figure 5:
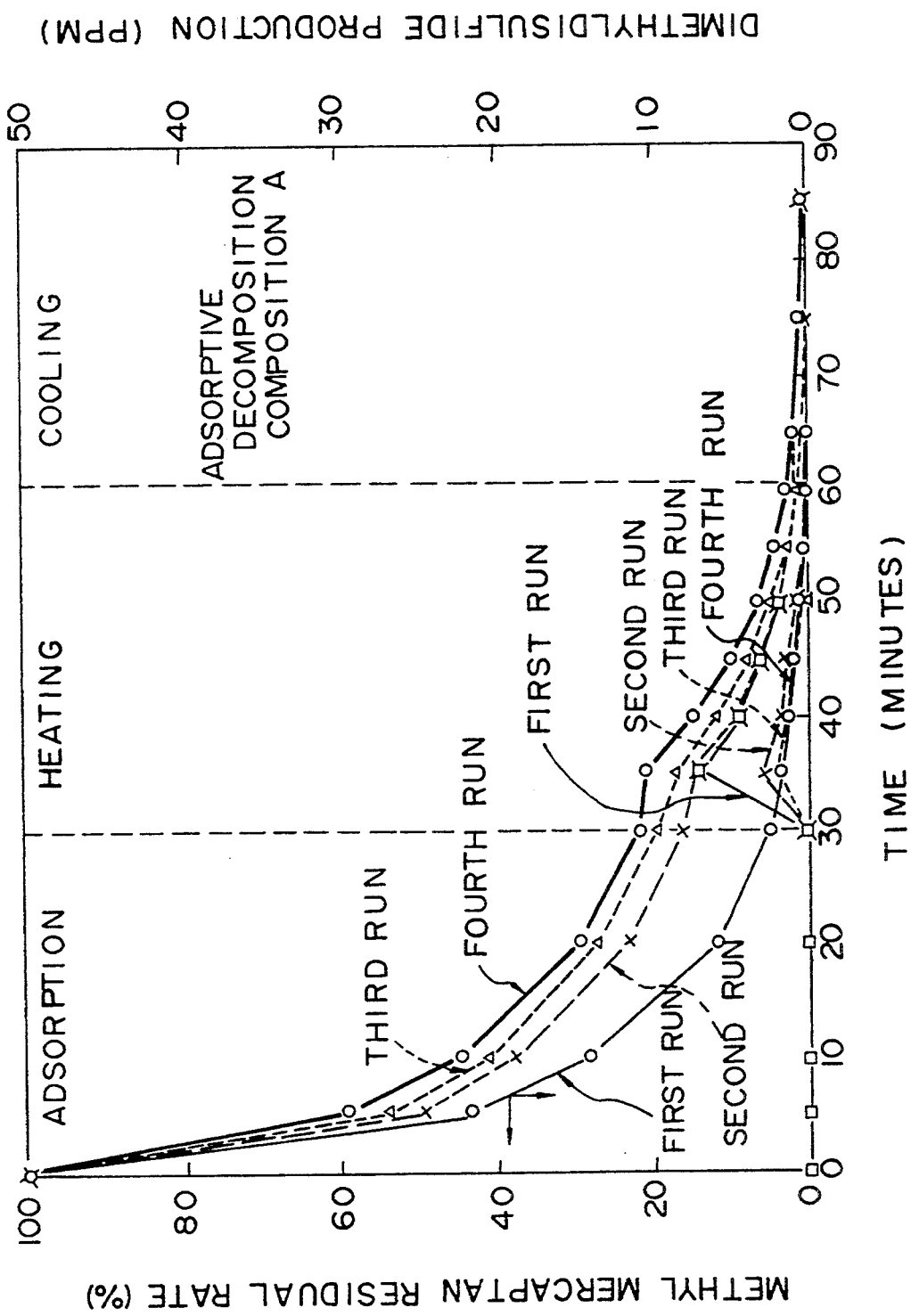

The same methyl mercaptan-test procedure as Example 5 was repeated four times for Adsorptive Decomposition Composition A. The results are shown in FIG. 5. The Figure shows that the performance of Adsorptive Decomposition Composition A of the present invention still retained sufficient adsorption capacity and desorption—decomposition capability though they did decrease to a small extent as the test was repeated.

Example 10

Trimethylamine Reaction Test

Figure 6:
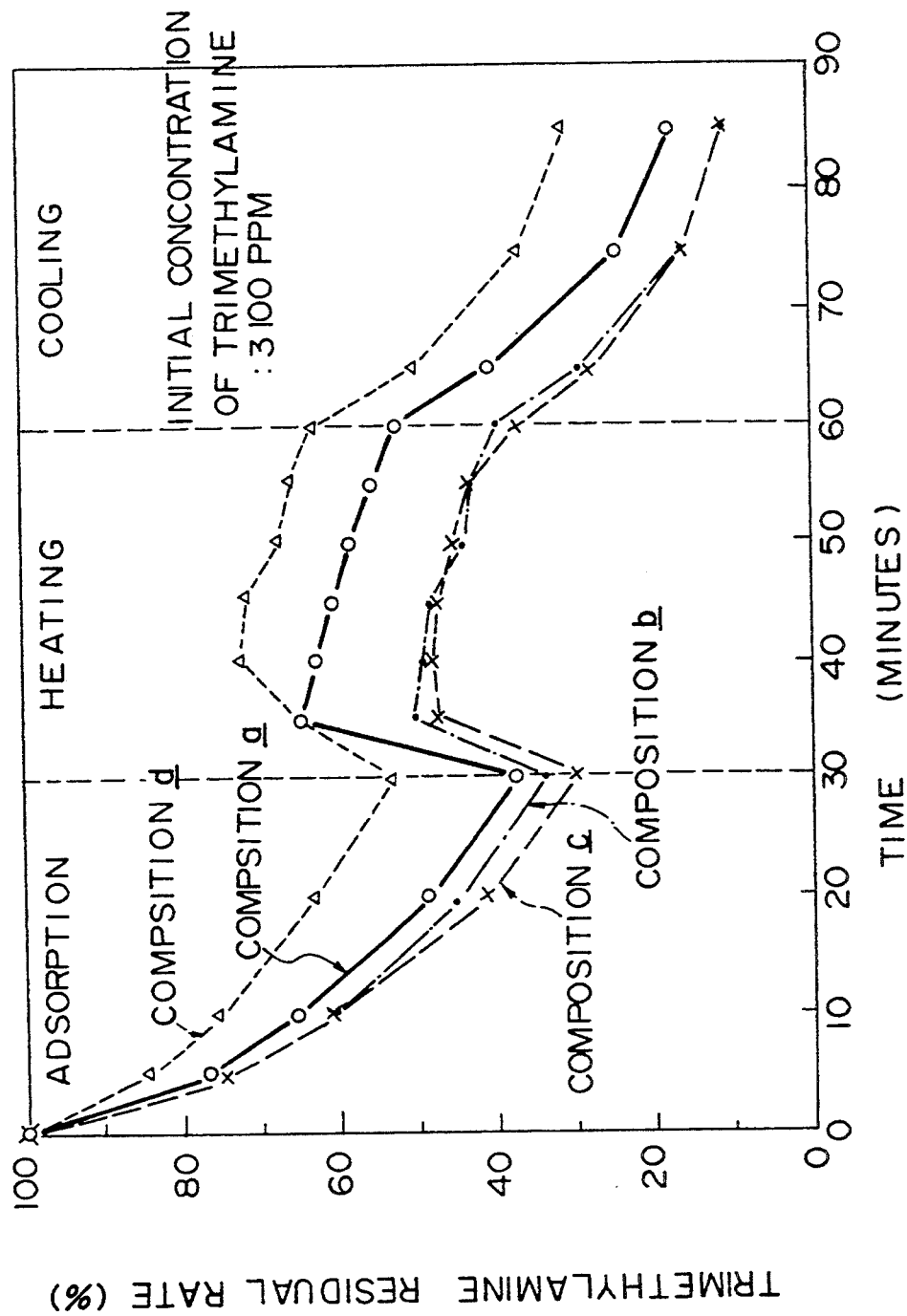

The same procedure as Example 5 was repeated, except that 3100 ppm of trimethylamine was used as a gas that was to be treated, instead of 100 ppm of methyl mercaptan. The results are shown in FIG. 6. It is evident from the FIG. 6 that Plate Moldings of the present invention have a large adsorption rate even in treatments of trimethylamine.

Example 11

Figure 7:
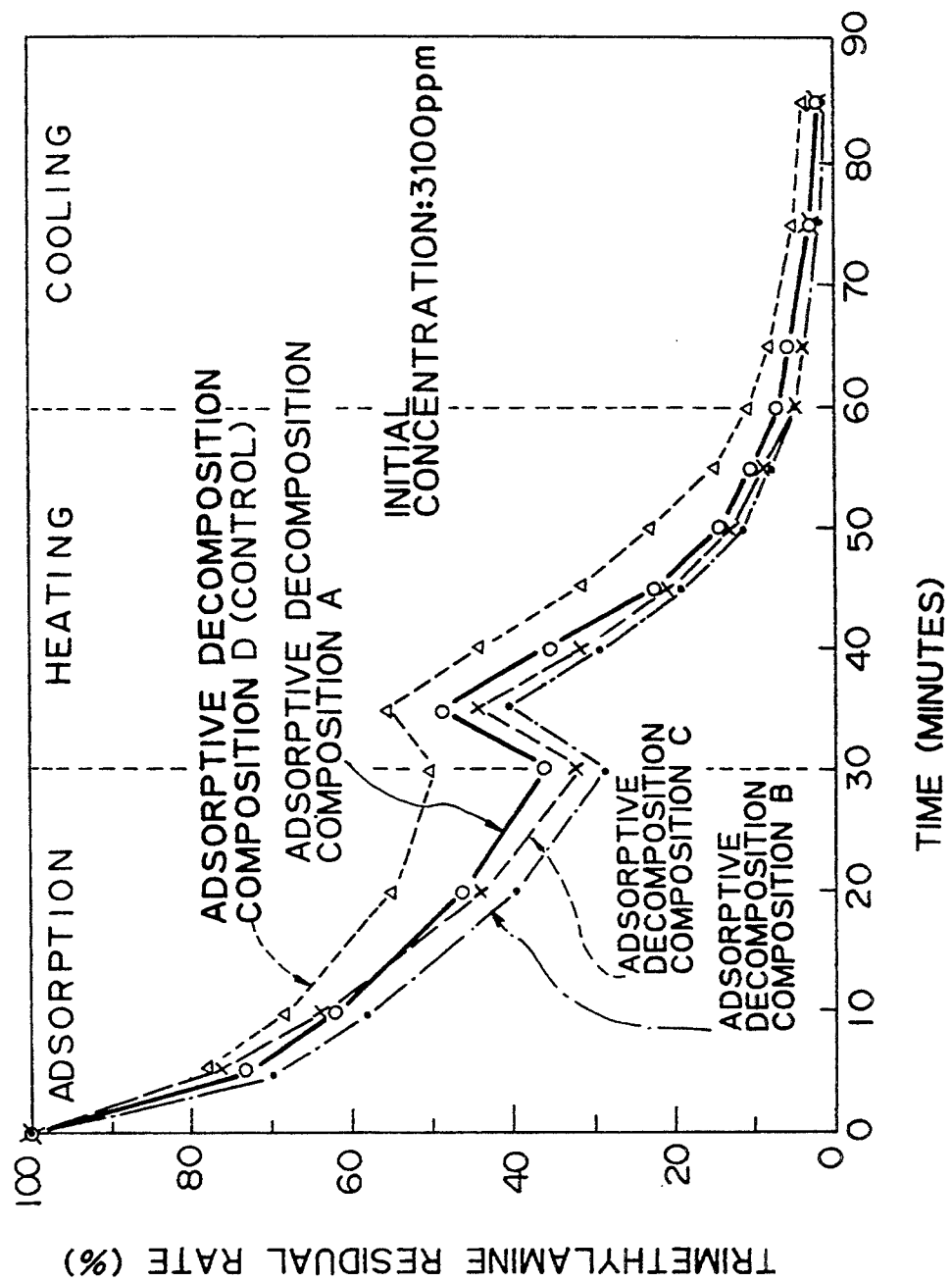

Each of Adsorptive Decomposition Compositions A, B and C and Control D was subjected to the trimethylamine test as mentioned in Example 10. The results are illustrated in FIG. 7. The FIG. 7 shows that the adsorptive decomposition compositions of this invention have adsorption and desorption rates both of which are remarkably larger than those of the control that was prepared by supporting a catalyst component onto a sepiolite without zeolite.

Example 12

Figure 8:
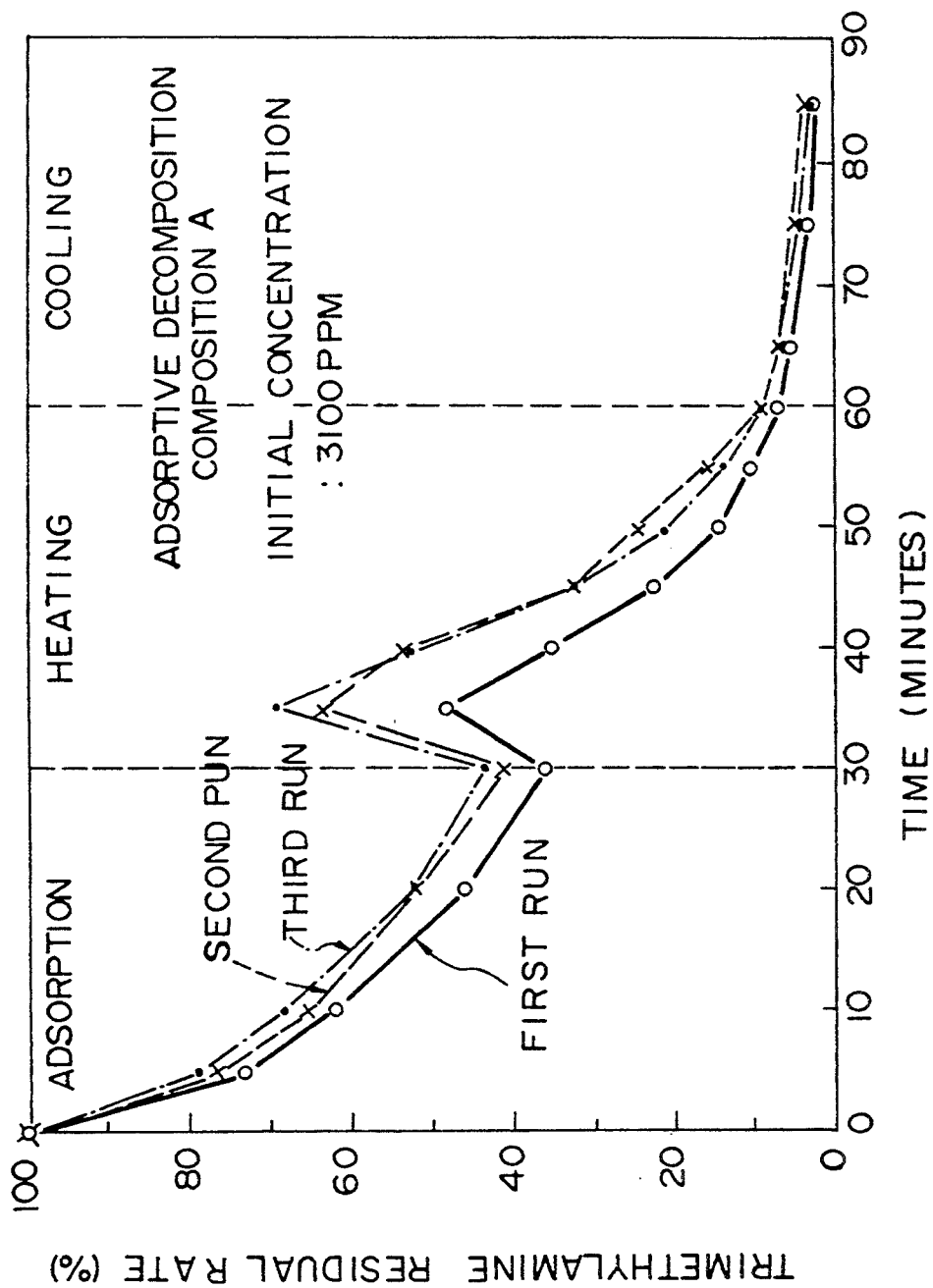

The same trimethylamine-test as Example 10 was repeated three times with Adsorptive Decomposition Composition A. The results are shown in FIG. 8. The FIG. 8 shows that the performance of Adsorptive Decomposition Composition A of the present invention still retained sufficient adsorption capacity and desorption—decomposition capability though it decreased to a small extent as the test was repeated.

Example 13

Ethanol Reaction Test

Figure 9:
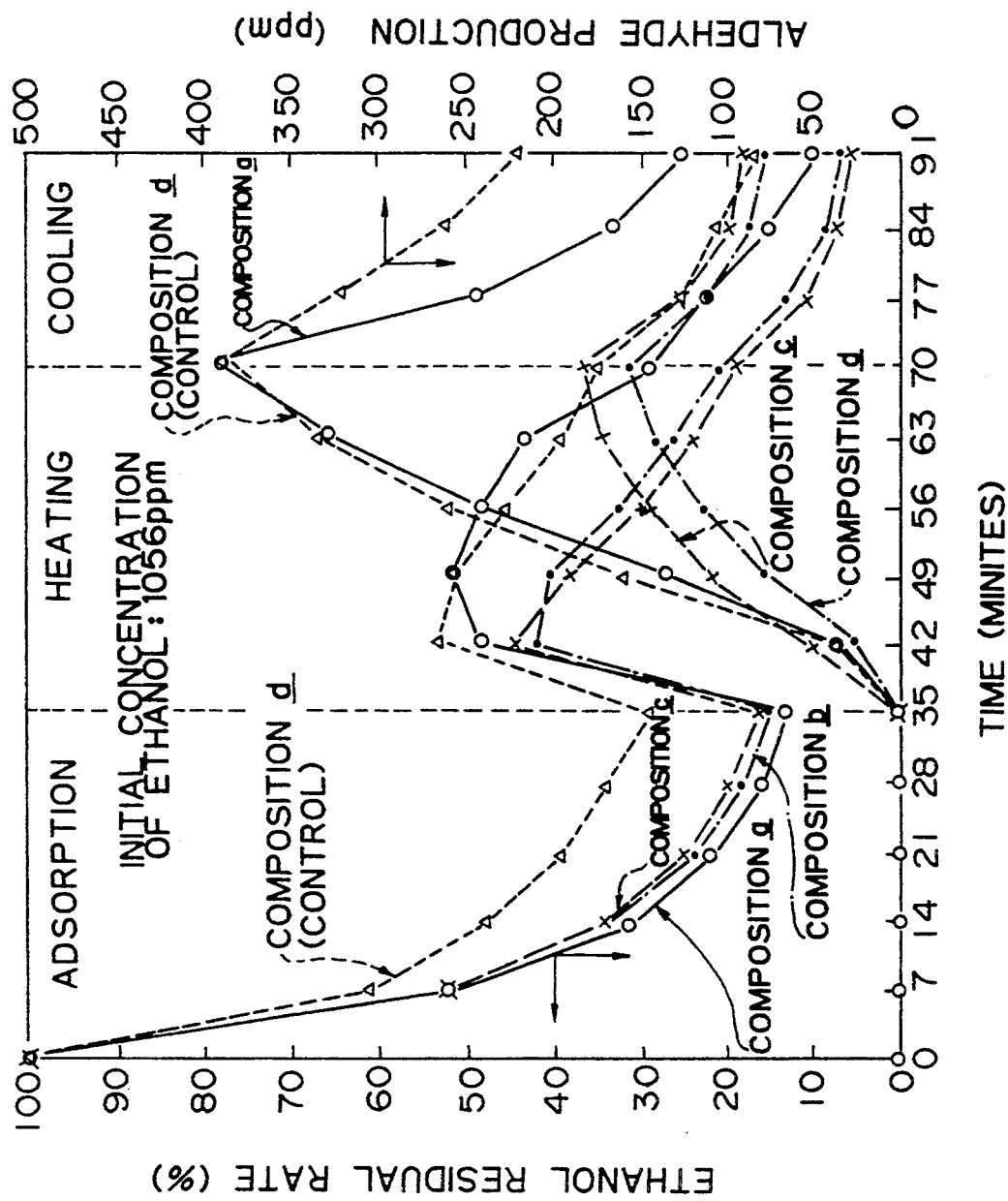

The same procedure as Example 5 was repeated, except that 1056 ppm of ethanol was used as a gas that was to be treated instead of 100 ppm of methyl mercaptan, and except that both adsorption and heating were carried out for 35 minutes and cooling for 21 minutes. The results are shown in FIG. 9. It is evident from the FIG. 9 that Plate Moldings of the present invention have a large adsorption rate even in treatments of ethanol.

Example 14

Figure 10:
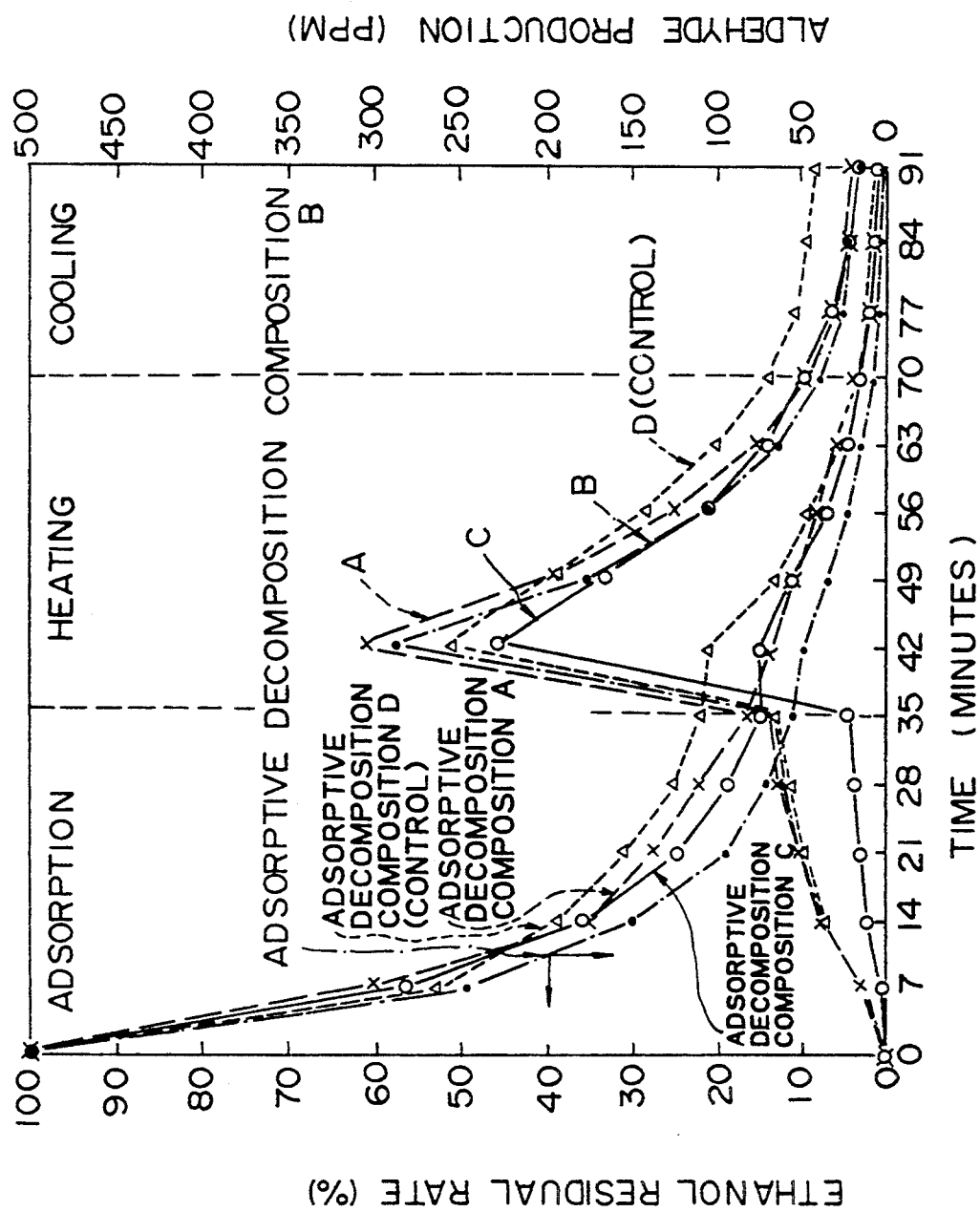

Each of Adsorptive Decomposition Component A, B, C and a control D was subjected to the ethanol test as described in Example 13. The results are illustrated in FIG. 10. The FIG. 10 shows that Adsorptive Decomposition Compositions of this invention have a large adsorption and a large desorption rate.

Example 15

Each of Adsorptive Decomposition Compositions A, B and C and Control D was subjected to the same ethanol test as Example 13, except that each sample was dampened with 1 cc of water per one plate. The results are shown in FIG. 11. Among the compositions of the present invention, Adsorptive Decomposition Composition A in which a catalyst was supported onto Plate Molding a having silicalite as zeolite, shows a large adsorption and desorption—decomposition rate of ethanol in spite of the composition being wet.

Adsorptive compositions and adsorptive decomposition compositions of the present invention have a large adsorption and desorption rate, and get little degradation in their performances at repeated use. Deodorizing can be carried out continuously since they can be regenerated in situ without taken out of the apparatus. Thus no complicated incidental equipment is needed for regeneration. Furthermore, the present compositions exhibit excellent water resistance, that is, they exhibit a large adsorption and decomposition capacity even when they are wet. Thus such compositions can be used under severe circumstances of high humidity. For example, during defrosting in the storage compartments of a refrigerator, conventional deodorizers get wet and their performance is lowered. Compositions of the present invention have an excellent resistance to humidity and do not suffer any deterioration thereby and thus are much more suitable for use under such severe conditions.

What is claimed is:

1. A method of deodorizing air containing unpleasant odors or noxious components which comprises contacting the gas with an adsorptive composition comprising sepiolite in an amount of 60–30 wt. % and a zeolite in an amount of 40–70 wt. % at room or lower temperatures in an atmosphere of room or higher humidity up to saturated humidity and under atmospheric pressure to thereby deodorize the gas, said zeolite having a silica/alumina ratio of at least 150.

2. A method of deodorizing air according to claim 1, wherein said zeolite is selected from the group consisting of ZSM-5, Silicalite and de-aluminized Zeolite A, Zeolite X, Zeolite Y and Zeolite L.

3. A method of deodorizing a gas according to claim 1, wherein said zeolite has a silica/alumina ratio of at least 400.

4. A method of deodorizing a gas according to claim 1, wherein a catalyst component is supported on the adsorptive composition.

5. A method of deodorizing air according to claim 4, wherein said catalyst component is a metal element, an oxide or a composition of at least one metal selected from the group consisting of platinum group metals, Group IB metals, Group VIIB metals and rare earth metals.

6. A method of deodorizing a gas according to claim 5, wherein said catalyst component is platinum.

7. A method of deodorizing a gas according to claim 1, wherein said zeolite is Silicalite.

8. A method of purifying air containing unpleasant odors or noxious components, which comprises adsorbing such odors or noxious components in the gas on an adsorptive decomposition composition comprising a catalyst component supported on an adsorptive composition comprising a sepiolite in an amount of 60–30 wt. % and a zeolite in an amount of 40–70 wt. % at room or lower temperatures in an atmosphere of room or higher humidity up to saturated humidity and under atmospheric pressure, said zeolite having a silica/alumina ratio of at least 150, and periodically or non-periodically heating said adsorptive decomposition composition up to a temperature in the range of 200°–500° C. by a heater to desorb and catalytically oxidize the adsorbates therefrom, stopping the heating of said adsorptive decomposition composition to allow said adsorptive decomposition composition to cool, and repeating the cycle of said adsorbing, said heating and said stopping to thereby carry out deodorization and in situ regeneration of said adsorptive decomposition composition.

9. A method of deodorizing air according to claim 8, wherein said sepiolite is selected from the group consisting of ZSM-5, Silicalite and de-aluminized Zeolite A, Zeolite X, Zeolite Y and Zeolite L.

10. A method of purifying a gas according to claim 8, wherein said zeolite has a silica/alumina ratio of at least 400.

11. A method of purifying air according to claim 8, further comprising a catalyst component is a metal element, an oxide or a composition of at least one metal selected from the group consisting of platinum group metals, Group IB metals, Group VIIB metals and rare earth metals.

12. A method of deodorizing a gas according to claim 11, wherein the catalyst component is platinum.

13. A method of purifying a gas according to claim 8, wherein said zeolite is Silicalite.

14. A method of purifying a gas according to claim 8, wherein said gas is the air existing in the storage compartment of a refrigerator and said heater is a defrosting heater.

* * * * *